United States Patent
Kawase et al.

(10) Patent No.: US 7,481,359 B2
(45) Date of Patent: Jan. 27, 2009

(54) AUTOMATIC TRANSACTION SYSTEM

(75) Inventors: Hiroyuki Kawase, Saitama (JP); Susumu Ueda, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 488 days.

(21) Appl. No.: 11/126,346

(22) Filed: May 11, 2005

(65) Prior Publication Data

US 2005/0262017 A1    Nov. 24, 2005

(30) Foreign Application Priority Data

May 24, 2004 (JP) .............................. 2004-153850

(51) Int. Cl.
*G06Q 40/00* (2006.01)
(52) U.S. Cl. ...................................... 235/379
(58) Field of Classification Search .................. 235/379
See application file for complete search history.

(56) References Cited

U.S. PATENT DOCUMENTS 6,234,389 B1 * 5/2001 Valliani et al. .............. 235/380
6,814,282 B2 * 11/2004 Seifert et al. ................ 235/379

FOREIGN PATENT DOCUMENTS

JP     2001-175783      6/2001

* cited by examiner

*Primary Examiner*—Jamara A Franklin
(74) *Attorney, Agent, or Firm*—Venable LLP; Michael A. Sartori; Catherine M. Voorhees

(57) ABSTRACT

An automatic transaction system has a cellular phone of a customer and an automatic teller machine (ATM) which can directly communicate with the cellular phone by infrared communication. When the customer performs a transaction by the ATM, transaction information such as transfer information registered in the cellular phone is directly inputted to the ATM and the ATM executes a transaction process by the transaction information which was directly received. When transaction data which is used in the transaction by the ATM is inputted once, transaction time in the ATM can be shortened by the simple operation.

7 Claims, 10 Drawing Sheets

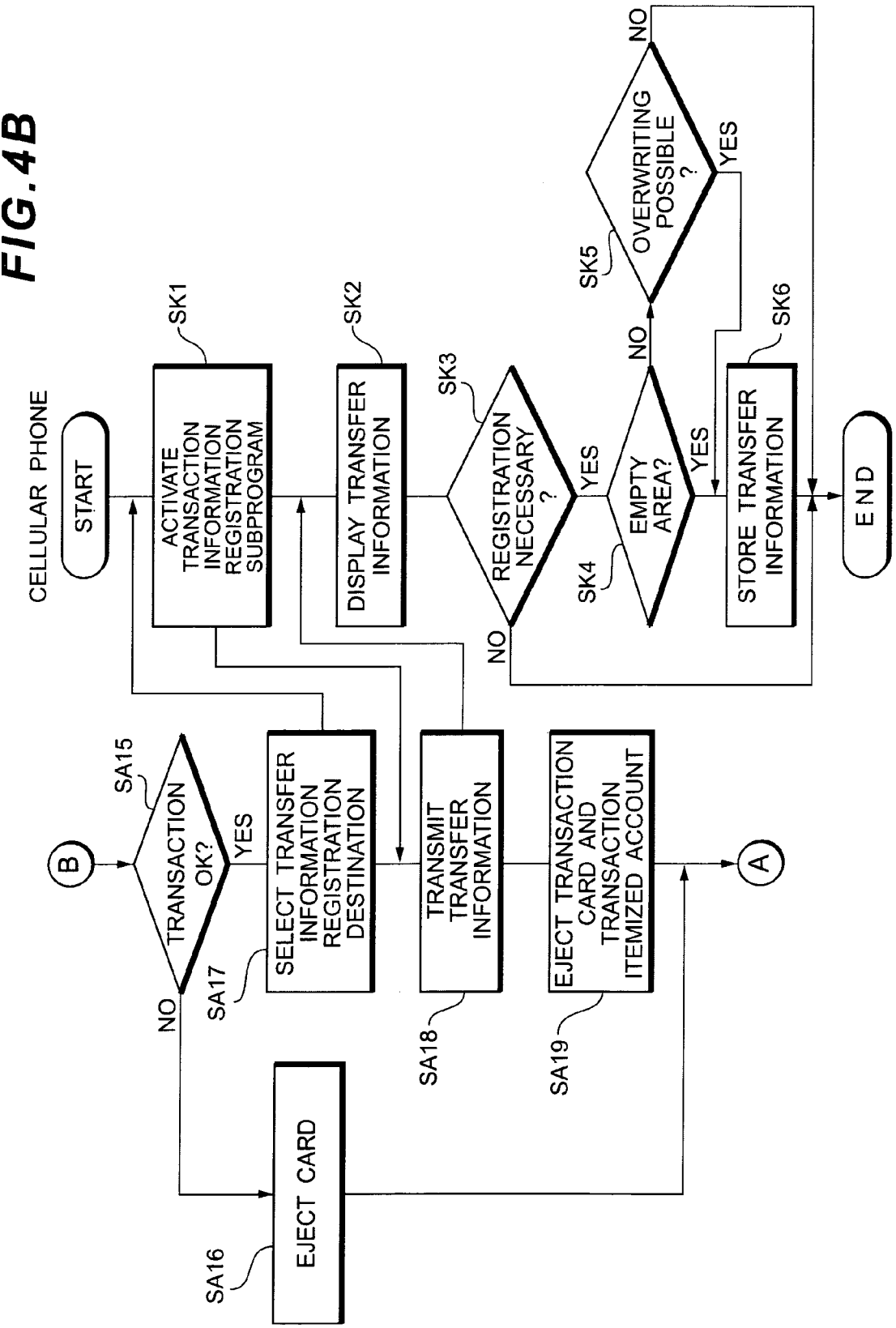

FIG.7

SELECT REGISTRATION DESTINATION OF
TRANSFER INFORMATION

NOT-REGISTER

ISSUE TRANSFER
CARD

CELLULAR PHONE
REGISTRATION

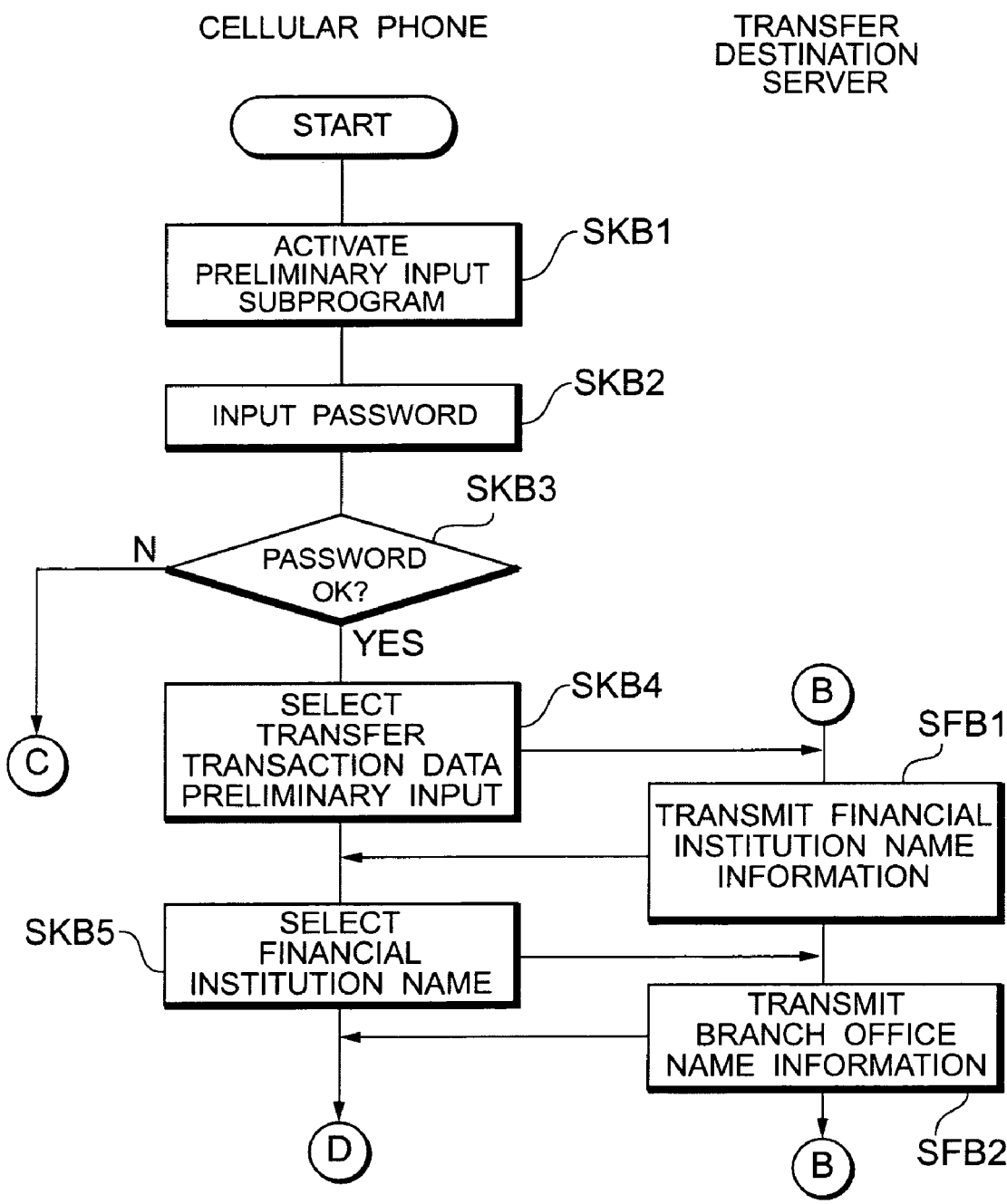

AUTOMATIC TRANSACTION SYSTEM

BACKGROUND OF THE INVENTION

1. Field of the Invention

The invention relates to an automatic transaction system for performing a transaction in an automatic transaction apparatus set in a service office of a financial institution or the like by using a personal digital assistant.

2. Related Background Art

In a conventional transaction by an automated teller machine (hereinafter, abbreviated to an ATM) using a cellular phone as a personal digital assistant (hereinafter, abbreviated to a PDA), a customer preliminarily registers a telephone number of his own cellular phone into a financial institution, when the transaction is performed, he preliminarily calls a nearest service office of the financial institution, inputs a kind of transaction, a transaction money amount, an account number, and the like by using a ten-key or the like of his cellular phone, and makes a reservation of the transaction. A main control unit of the service office transfers the inputted information and the telephone number which has automatically been identified to a host computer and inquires about the permission/inhibition of the transaction. If the transaction is permitted, the main control unit accepts the reservation and stores it as transaction reservation information into a memory.

When the customer arrives at the service office to which he had made the reservation, he is detected from the telephone number which is periodically transmitted from the cellular phone and notified of the ATM for performing the transaction by a display plate. When the customer inserts the cellular phone into the ATM, whether or not he is an authorized person is confirmed by the telephone number, the transaction is executed on the basis of the transaction reservation information stored in the memory, and transaction time in the ATM is shortened (for example, refer to JP-A-2001-175783 (page 3, paragraph No. [0012] to page 4, paragraph No. [0020], and FIG. 1)).

However, in the foregoing conventional technique, since the customer preliminarily calls the nearest service office of the financial institution from the cellular phone every transaction, inputs the kind of transaction, the transaction money amount, the account number, and the like, and makes the reservation of the transaction, there is such a problem that in the case where a specific money amount is paid a plurality of number of times or it is necessary to transfer a money amount to the same transfer destination many times, the same contents or the like have to be inputted many times.

Particularly, in the case of a transfer transaction, there is such a problem that since there are many items to be inputted, it takes time to input data and use convenience of the customer is deteriorated.

SUMMARY OF THE INVENTION

The invention is made to solve the foregoing problems and it is an object of the invention to provide means which can shorten a transaction time in an ATM by a simple operation if transaction data which is used in a transaction by the ATM is inputted once.

According to the present invention, there is provided an automatic transaction system comprising:

a personal digital assistant of a customer; and an automatic transaction apparatus constructed so that it can directly communicate with the personal digital assistant, wherein the automatic transaction apparatus has transaction information direct receiving means which directly receives transaction information from the personal digital assistant, and the personal digital assistant has transaction information storing means which stores the transaction information, transaction information display means which reads out the transaction information from the transaction information storing means and displays it, and transaction information direct transmitting means which directly transmits the corresponding transaction information to the automatic transaction apparatus when the displayed transaction information is selected.

In the automatic transaction system, the automatic transaction apparatus may further have transaction-information direct transferring means which, when the transaction information is inputted by a method other than the personal digital assistant, directly transfers the inputted transaction information to the personal digital assistant; and the personal digital assistant may further have transaction information writing means which, when the transferred transaction information is received, writes the transaction information into the transaction information storing means.

Moreover, in the automatic transaction system, the automatic transaction apparatus may further have automatic activating command transmitting means which transmits a command for automatically activating a program stored in the personal digital assistant; and the personal digital assistant may further have program activating means which directly receives the automatic activating command and activates the corresponding program.

In the automatic transaction system, the transaction information may be transfer information. In this case, the automatic transaction system may further comprise a transfer destination server, wherein the personal digital assistant may comprise transfer information preliminary inputting means which preliminarily inputs the transfer information and financial institution information transmitting request transmitting means which transmits a transmitting request of the financial institution information to the transfer destination server; and the transfer destination server may comprise financial institution information storing means which stores the financial institution information and financial institution information transmitting means which, when the financial institution information transmitting request is received, reads out the financial institution information from the financial institution information storing means and transmits it to the personal digital assistant.

As mentioned above, according to the invention, since the transaction information registered in the PDA is directly transmitted as transaction information of the transaction in the ATM and transaction data can be inputted, the following effects are obtained. That is, the inputting operation can be simplified, the transaction time can be shortened, a working efficiency of the ATM can be improved, the transaction information which has been registered once can be read out many times and a similar transaction can be performed, and troublesomeness in association with the input of the transaction data of the customer can be eliminated.

The above and other objects and features of the present invention will become apparent from the following detailed description and the appended claims with reference to the accompanying drawings.

BRIEF DESCRIPTION OF THE DRAWINGS

FIG. 7 is a diagram showing a display example of the display screen to select a transfer information registration destination in the embodiment 1;

DETAILED DESCRIPTION OF THE PREFERRED EMBODIMENTS

Embodiments of an automatic transaction system according to the invention will be described hereinbelow with reference to the drawings.

Embodiment 1

Figure 1:
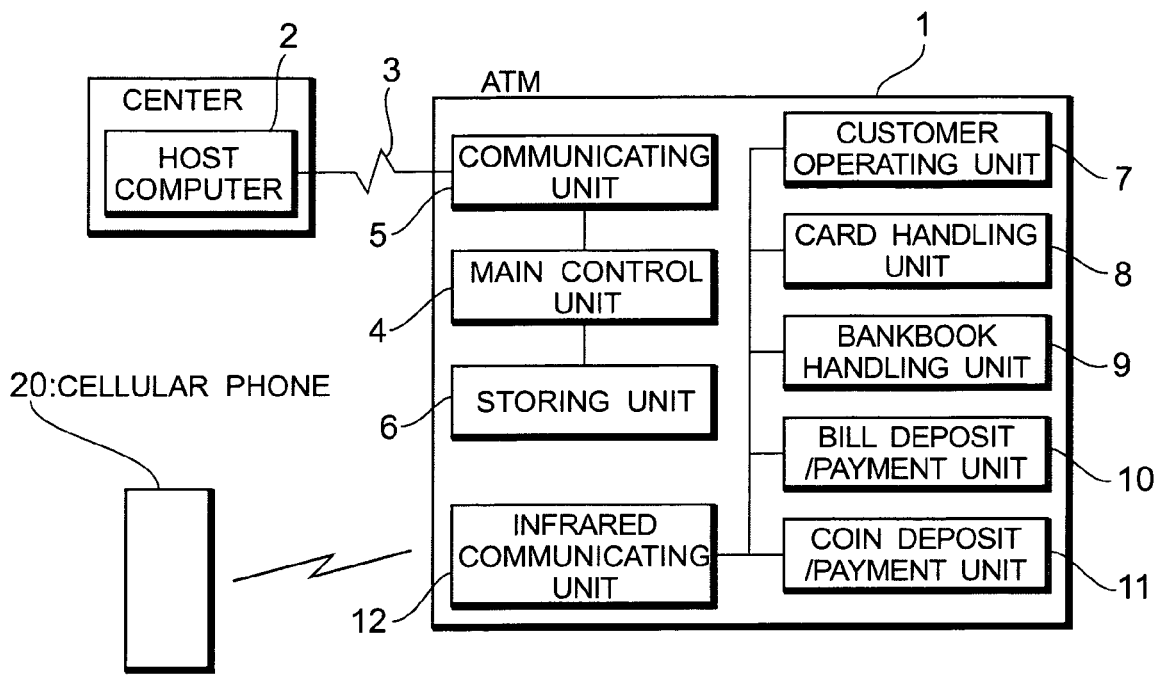
FIG. 1 is a block diagram showing an ATM in the embodiment 1.
Figure 2:
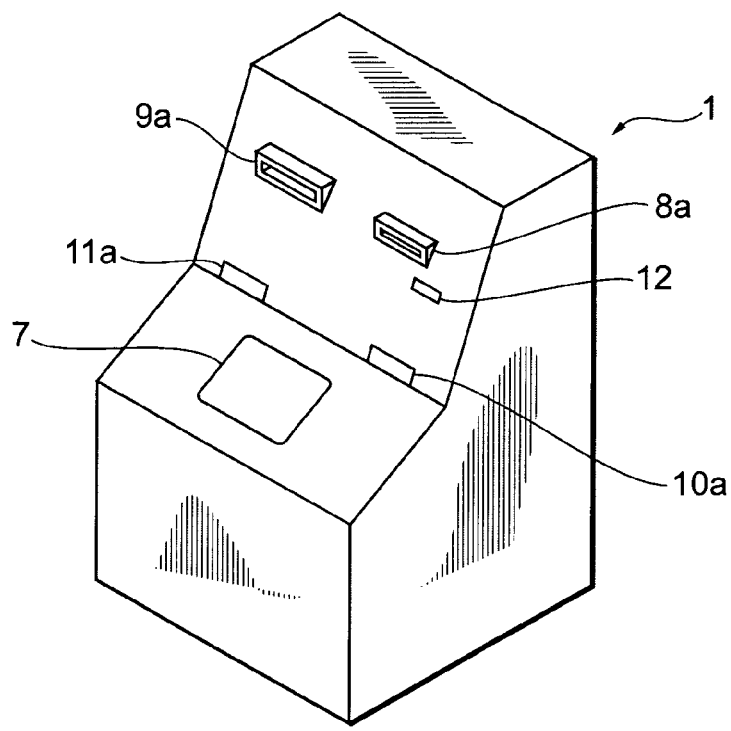
FIG. 2 is a perspective view showing the ATM in the embodiment 1.
Figure 3:
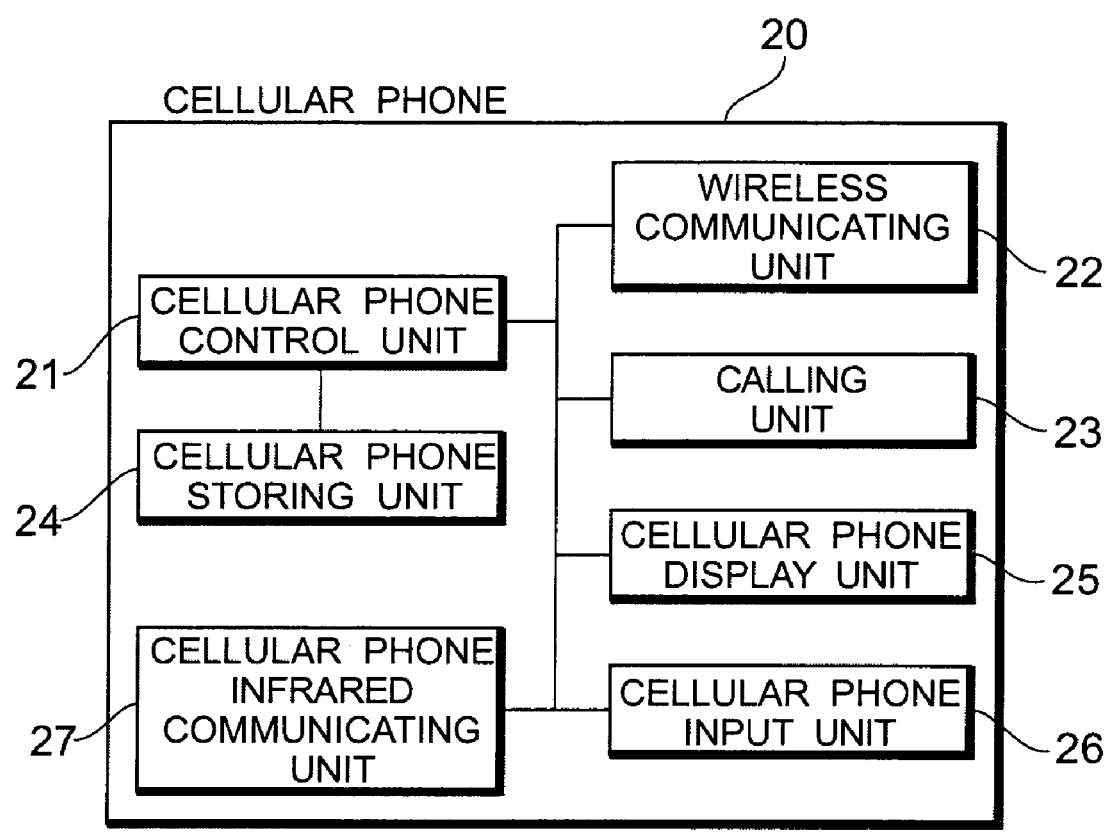
FIG. 3 is a block diagram showing a cellular phone in the embodiment 1.

FIG. 1 is a block diagram showing an automated teller machine (ATM) in the embodiment 1. FIG. 2 is a perspective view showing the ATM in the embodiment 1. FIG. 3 is a block diagram showing a cellular phone in the embodiment 1.

In FIGS. 1 and 2, reference numeral 1 denotes an ATM as an automatic transaction apparatus. The ATMs are set in service offices of a financial institution such as a bank or the like, the Japan Postal Services Corporation, a convenience store and the like (also referred to as a financial institution and the like), service offices of a post office, or the like and a spot transaction with the customers is automatically performed.

Reference numeral 2 denotes a host computer as an upper apparatus set in a center of the financial institution or the like. The host computer 2 is connected to the ATM 1 in the service office through a communication line 3 such as dedicated line, telephone line, or the like. The host computer 2 holds customer information such as account number, personal identification number, account balance, and the like of the account of each customer and manages the accounts of the customers.

Reference numeral 4 denotes a main control unit of the ATM 1. The main control unit 4 is connected to the host computer 2 through the communication line 3 by a communicating unit 5, controls each unit in the ATM 1, executes a transaction process or the like, and also controls data communication or the like.

Reference numeral 6 denotes a storing unit. A program which is executed by the main control unit 4, various data which is used for such a program, a processing result by the main control unit 4, and the like are stored in the storing unit 6.

Reference numeral 7 denotes a customer operating unit constructed by a combination of a display screen such as an LCD or the like and position signal detecting means such as a touch panel or the like. The customer operating unit 7 displays a transaction selecting display screen, various input display screens, a display screen for promoting a procedure of the customer, or the like onto the display screen and receives an input from the customer by the position signal detecting means.

Reference numeral 8 denotes a card handling unit having a function for reading out card information recorded on a magnetic stripe of a transaction card such as a customer's cash card or the like inserted from a card inserting port 8a or writing the card information onto the magnetic stripe. The card handling unit 8 also has a function for printing a transaction itemized account or the like.

Reference numeral 9 denotes a bankbook handling unit having a function for reading out bankbook information recorded on the magnetic stripe of the bankbook inserted from a bankbook inserting port 9a or writing the bankbook information onto the magnetic stripe. The bankbook handling unit 9 also has a function for recording transaction contents or the like onto the bankbook of the customer.

Reference numeral 10 denotes a bill deposit/payment unit. The bill deposit/payment unit 10 has a function for receiving bills inputted by the customer through a bill deposit/payment port 10a, and identifying, counting, and enclosing the inputted bills and a function for counting the bills to be paid to the customer, ejecting them from the bill deposit/payment port 10a, and giving them to the customer.

Reference numeral 11 denotes a coin deposit/payment unit. The coin deposit/payment unit 11 has a function for receiving coins inputted by the customer through a coin deposit/payment port 11a, and identifying, counting, and enclosing the inputted coins and a function for counting the coins to be paid to the customer, ejecting them from the coin deposit/payment port 11a, and giving them to the customer.

Reference numeral 12 denotes an infrared communicating unit having a function for making short range data communication by using the fact that infrared rays are one kind among electromagnetic waves. The infrared communicating unit 12 directly makes the data communication with a cellular phone 20 as a personal digital assistant (PDA) of the customer.

In FIG. 3, reference numeral 21 denotes a cellular phone control unit of the cellular phone 20. The cellular phone control unit 21 controls each unit in the cellular phone 20, enables a wireless communicating unit 22 to make telephone communication by a calling unit 23 constructed by a microphone, a speaker, or the like, and also controls the data communication or the like.

Reference numeral 24 denotes a cellular phone storing unit having a function for storing a program which is executed by the cellular phone control unit 21, various data which is used for such a program, a processing result by the cellular phone control unit 21, and the like.

Reference numeral 25 denotes a cellular phone display unit having a display screen such as an LCD or the like. The cellular phone display unit 25 has a function for displaying display data such as characters, image, or the like formed by the cellular phone control unit 21.

Reference numeral 26 denotes a cellular phone input unit having a ten-key, a crucial key, various operation buttons, and the like. The cellular phone input unit 26 functions as input means which is used for the customer to input the telephone number and the like or input or select the transaction information or the like.

Reference numeral 27 denotes a cellular phone infrared communicating unit having a function for directly transmitting and receiving data to/from the infrared communicating unit 12 of the ATM 1 by the short range data communication using the infrared rays.

The infrared communication which is used in the embodiment is constructed so that mutual data communication can be made on the basis of a communication standard defined in, for example, IrDA (Infrared Data Association).

A work processing program has previously been stored in the storing unit 6 of the ATM 1 mentioned above. That is, the work processing program is constructed by adding an application program having a function for directly transmitting the transaction information such as transfer information and the like to the cellular phone by the infrared communication, a function for performing various transactions on the basis of the transaction information which was directly received from the cellular phone, and the like to an ordinary transaction processing program for performing various transactions with the customer. Various functioning means are formed as hardware which is formed by the main control unit 4 and processing steps of the work processing program.

A transaction information processing program has been stored in the cellular phone storing unit 24 of the cellular phone 20. The transaction information processing program has: a transaction information registration subprogram having a function wherein when the customer opens an account with the financial institution or the like, he makes a contract with the financial institution, receives the transaction information such as transfer information and the like presented from the financial institution by the infrared communication, and stores it into the cellular phone storing unit 24; a transaction information transmission subprogram having a function wherein the registered transaction information is transmitted by the infrared communication and directly inputted to the ATM 1; and the like. Various functioning means are formed as hardware which is formed by the cellular phone control unit 21 and processing steps of the transaction information processing program.

Further, a transaction information registration area to register the transaction information is assured in the cellular phone storing unit 24. Personal information similar to the card information of the transaction card which is issued from the financial institution when the above contract is made, that is, information such as name of the financial institution or the like of the account of the customer (hereinafter, referred to as a financial institution name), name of the service office (hereinafter, referred to as a branch office name), account number, and the like has previously been stored in the cellular phone storing unit 24 as data which is used in the transaction information processing program. Thus, the cellular phone 20 performs the function as a transaction card of the customer.

The operation of the above construction will now be described.

In the description, the information constructed by the transaction kind and its transaction data is referred to as transaction information. The transaction information in the embodiment denotes the transaction information (hereinafter, referred to as a transfer information) in which the transaction kind is set to the transfer transaction and the transaction data is set to the name of the financial institution of the transfer destination, its branch office name, the account number of the transfer destination, its subject, a name of a receiver, a name of a requester, and a transfer money amount.

Figure 4A:
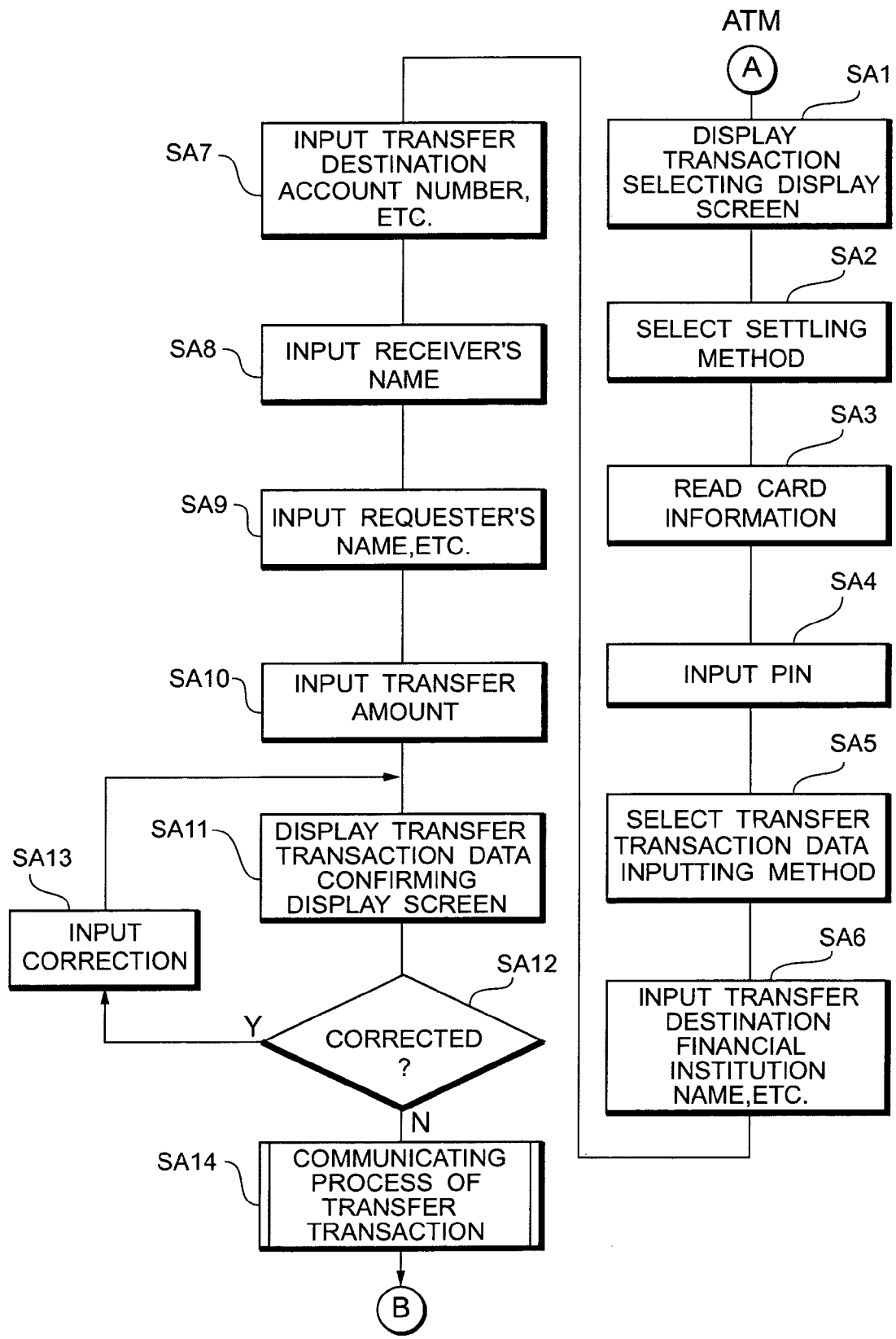
FIG. 4 is a flowchart showing a transaction information registering process in a transfer transaction in the embodiment 1.

The transfer information registering process which is executed when the customer registers the transfer information as transaction information into the cellular phone storing unit 24 by using the cellular phone 20 will now be described in accordance with processing steps with reference to a flowchart shown in FIG. 4. A step name in the case of the cellular phone 20 is shown with "SK" and that in the case of the ATM 1 is shown with "SA".

Figure 5:
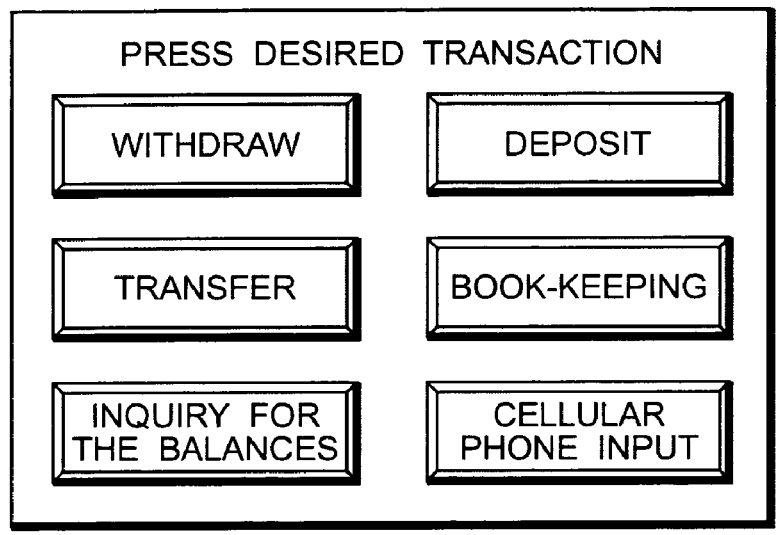
FIG. 5 is a diagram showing a display example of a display screen to select a transaction in the embodiment 1.

SA1: The main control unit 4 of the ATM 1 displays a transaction selecting display screen shown in FIG. 5 for selecting the transaction kind onto the display screen of the customer operating unit 7 in accordance with the work processing program and enters a standby mode.

The following transaction selection buttons to select the transaction are displayed on the transaction selecting display screen: a "withdrawal" button for a paying transaction as a transaction kind; a "deposit" button for a deposit transaction; a "transfer" button for a transfer transaction; a "book-keeping" button for a book-keeping transaction for recording non-written transaction data onto a bankbook; an "inquiry for the balances" button for a balance inquiry transaction for inquiring about an account balance; a "cellular phone input" button for receiving the input of the transaction information from the cellular phone 20; and the like.

In the embodiment, the customer selects the transfer transaction as a transaction kind from the display screen of the customer operating unit 7 and presses the "transfer" button on a touch panel.

SA2: The main control unit 4 which recognized the depression of the "transfer" button by a position signal or the like on the touch panel displays a settling method selecting display screen onto the display screen of the customer operating unit 7.

The following contents are displayed on the settling method selecting display screen: a message for urging the customer to select the settling method and its operating method; and a settlement selecting button such as "card transfer" button for selecting the settlement by a transaction card, "cash transfer" button for selecting the settlement by cash, and the like. In the embodiment, the customer presses the "card transfer" button in order to make the settlement by the transaction card.

SA3: The main control unit 4 which recognized the depression of the "card transfer" button displays a card insertion request display screen showing a message or the like for urging the customer to insert the transaction card. The customer inserts the transaction card into the card handling unit 8 in accordance with such a message.

At this time, the main control unit 4 reads out the card information recorded on the magnetic stripe on the transaction card by the card handling unit 8.

SA4: The main control unit 4 which read the card information displays a personal identification number (PIN) input display screen onto the display screen of the customer operating unit 7, thereby urging the customer to input his personal identification number.

A message for urging the customer to input the PIN, a PIN display column, a ten-key for inputting the PIN, a "correct" button to correct an input error, and the like are displayed on the PIN input display screen. The customer inputs the PIN by the ten-key or the like.

Figure 6:
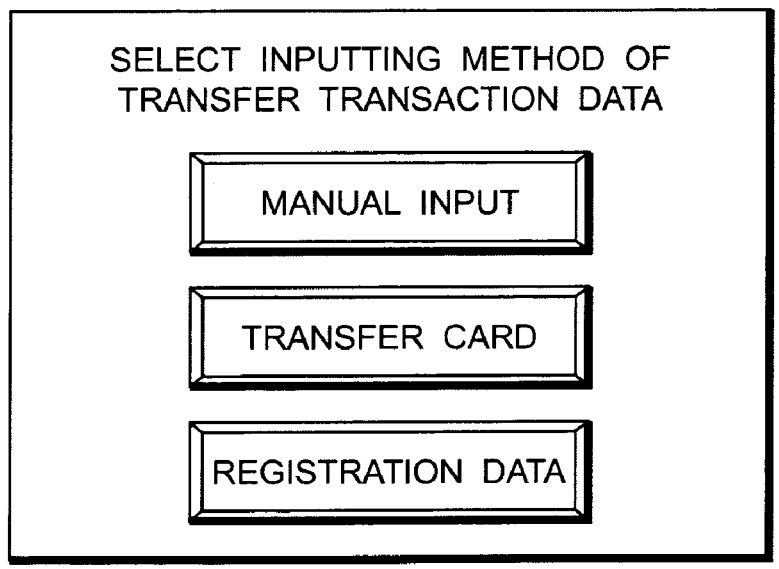
FIG. 6 is a diagram showing a display example of the display screen to select a method of inputting transfer transaction data in the embodiment 1.

SA5: The main control unit 4 which recognized the input of the PIN receives the input of the PIN and displays a transfer transaction data inputting method selecting display screen shown in FIG. 6 onto the display screen of the customer operating unit 7 in order to receive the input of transaction data of the transfer transaction (referred to as transfer transaction data).

The following items are displayed on the transfer transaction data inputting method selecting display screen: a "manual input" button for manually inputting the transfer transaction data by the customer operating unit 7 of the ATM 1; a "transfer card" button for inputting the transfer transaction data by the transfer card; a "registration data" button for inputting the transfer transaction data by using registration data of the transfer transaction which has preliminarily applied for and registered in the host computer 2; and the like. In the embodiment, the customer presses the "manual input" button displayed on the display screen of the customer operating unit 7.

SA6: The main control unit 4 which recognized the depression of the "manual input" button displays a transfer destination input display screen for inputting the name and the like of the financial institution of the transfer destination onto the display screen of the customer operating unit 7.

The following items are displayed on the transfer destination input display screen: a display column of the name of the financial institution of the transfer destination and its branch office name; KATAKANA character keys for inputting those names; a "correct" button to correct an input error; a "confirm" button for instructing the end of the input; and the like. The customer inputs the name and the like of the financial institution of the transfer destination by the KATAKANA character keys and the like and presses the "confirm" button.

SA7: The main control unit 4 which recognized the input of the name and the like of the financial institution of the transfer destination displays a transfer destination account input display screen for inputting the transfer destination account and the like onto the display screen of the customer operating unit 7.

A display column of the account number of the transfer destination and its subject, a ten-key for inputting them, a "correct" button to correct an input error, a "confirm" button for instructing the end of the input, and the like are displayed on the transfer destination input display screen. The customer inputs the account number of the transfer destination by the ten-key and the like and presses the "confirm" button.

SA8: The main control unit 4 which recognized the input of the account number and the like of the transfer destination displays a receiver input display screen for inputting the name of the receiver onto the display screen of the customer operating unit 7.

A display column of the name of the receiver, KATAKANA character keys for inputting the receiver's name, a "correct" button to correct an input error, a "confirm" button for instructing the end of the input, and the like are displayed on the receiver input display screen. The customer inputs the receiver's name by the KATAKANA character keys and the like and presses the "confirm" button.

SA9: The main control unit 4 which recognized the input of the receiver's name displays a requester input display screen for inputting the name and the like of the requester onto the display screen of the customer operating unit 7.

A display column of the name of the requester and his contact address, a ten-key and KATAKANA character keys for inputting them, a "correct" button to correct an input error, a "confirm" button for instructing the end of the input, and the like are displayed on the requester input display screen. The customer inputs the requester's name and the like by the ten-key, the KATAKANA character keys, and the like and presses the "confirm" button.

SA10: The main control unit 4 which recognized the input of the requester's name and the like displays a transfer money amount input display screen onto the display screen of the customer operating unit 7.

A display column of the transfer money amount, a ten-key for inputting the transfer money amount, a "ten-thousand" key, a "thousand" key, and a "yen" key for inputting a unit of the money amount, a "correct" button to correct an input error, and the like are displayed on the transfer money amount input display screen. The customer inputs the transfer money amount by the ten-key and the like and presses the "yen" button.

SA11: The main control unit 4 which recognized the input of the transfer money amount by the depression of the "yen" button displays a transfer transaction data confirming display screen onto the display screen of the customer operating unit 7 in order to determine the inputted transfer transaction data.

The following items are displayed on the transfer transaction data confirming input display screen: a message for urging the customer to confirm transfer information; an operating method in the case of correcting it; the name of the financial institution of the transfer destination, its branch office name, the account number of the transfer destination, its subject, a name of a receiver, a name of a requester, his contact address, and a transfer money amount as inputted transfer transaction data; a "correct" button to instruct correction of the transfer information; a "confirm" button to instruct that the display contents have been confirmed; and the like.

When the transfer transaction data is corrected, the customer selects the item to be corrected and depresses the "correct" button. When the display contents are confirmed and the transfer transaction data is determined, he presses the "confirm" button.

SA12: When the main control unit 4 recognized the depression of the "confirm" button, it is regarded that the transfer transaction data has been determined, and the processing routine advances to step SA14. When the main control unit 4 recognized the depression of the "correct" button, step SA13 follows.

SA13: The main control unit 4 which recognized the depression of the "correct" button displays a transfer transaction data correcting display screen according to the selected item onto the display screen of the customer operating unit 7.

For example, if the name of the financial institution of the transfer destination is selected as an item to be corrected, the main control unit 4 displays the name of the financial institution or the like inputted in step SA6 into each display column on the transfer destination input display screen described in step SA6 onto the display screen of the customer operating unit 7. The main control unit 4 displays a transfer transaction data correcting display screen on which a display color of the selected item has been changed. The customer inputs the name of the financial institution of the transfer destination again by the KATAKANA character keys and the like and presses the "confirm" button.

The main control unit 4 which recognized the depression of the "confirm" button is returned to step SA11 and displays again the transfer transaction data confirming display screen which shows the re-inputted financial institution's name and the like onto the display screen of the customer operating unit 7. When the "confirm" button is pressed on the transfer information confirming display screen, the processing routine advances from step SA12 to step SA14. This is true of the case where another item has been selected.

SA14: The main control unit 4 which recognized the decision of the transfer transaction data stores the determined transfer transaction data into the storing unit 6 and executes a communicating process of the transfer transaction with the host computer 2.

That is, the main control unit 4 displays a standby request display screen showing a message for urging the customer to wait for a little while onto the display screen of the customer operating unit 7. On the other hand, the main control unit 4 forms a transfer transaction telegraphic message attached with the PIN, the transfer transaction data, and the like inputted to the card information of the transaction card and transmits it to the host computer 2 through the communication line 3 by the communicating unit 5.

The host computer 2 which received the transfer transaction telegraphic message searches for customer information on the basis of the card information included in the transfer transaction telegraphic message, collates the PIN of the corresponding customer information with the PIN of the transfer transaction telegraphic message. If the PINs coincide, the customer is authenticated, the transfer money amount of the customer and a transfer fee are withdrawn from the account of the customer, an account balance of the customer is updated, and the financial institution of the transfer destination of the transfer transaction data is requested to pay the transfer money amount with the transfer transaction data attached.

The host computer 2 which finished the payment of the transfer money amount transmits a message indicating that the transfer transaction has been settled, as a transfer transaction result notification telegraphic message, to the ATM 1 through the communication line 3.

If the PINs do not coincide or the account balance is insufficient, a message which shows that the transfer transaction is not settled and to which a message showing each of those cases has been attached is transmitted as a transfer transaction result notification telegraphic message.

SA15: The main control unit 4 which received the transfer transaction result notification telegraphic message by the communicating unit 5 advances to step SA17 when the transfer transaction result notification telegraphic message indicates that the transfer transaction has been settled. The main control unit 4 advances to step SA16 when the transfer transaction is not settled.

SA16: The main control unit 4 which determined that the transfer transaction is not settled displays a transaction-incomplete confirming display screen with the following contents onto the display screen of the customer operating unit 7: a message showing that the transaction is not settled; a message for urging the customer to confirm it; a "confirm" button; and the like. The customer confirms the display contents and presses the "confirm" button.

The main control unit 4 which recognized the depression of the "confirm" button displays a display screen for urging the customer to receive a transaction card and ejects the transaction card by the card handling unit 8. After confirming that the customer has received the transaction card, the main control unit 4 deletes the transfer transaction data stored in the storing unit 6, finishes the transfer transaction process, returns to step SA1 through a connector (A), displays a transaction selecting display screen onto the display screen of the customer operating unit 7, and enters a standby mode.

SA17: The main control unit 4 which determined that the transfer transaction has been settled displays a transfer information registration destination selecting display screen shown in FIG. 7 onto the display screen of the customer operating unit 7.

A "not-register" button for instructing not to register the transfer information, an "issue a transfer card" button for instructing to issue a transfer card on which the transfer transaction data has been recorded, a "cellular phone registration" button for instructing to transfer and register the transfer information into the cellular phone 20, and the like are displayed on the transfer information registration destination selecting display screen. In the embodiment, the customer presses the "cellular phone registration" button on the display screen of the customer operating unit 7.

In order to activate a transaction information registering subprogram of a transaction information processing program of the cellular phone 20, the main control unit 4 which recognized the depression of the "cellular phone registration" button directly transmits an automatic activating instruction in which an automatic activating command, a name of the transaction information registering subprogram, and the like have been written to the cellular phone infrared communicating unit 27 of the cellular phone 20 by the infrared communicating unit 12.

When the "not-register" button is pressed, the main control unit 4 advances to step SA19. When the "issue a transfer card" button is pressed, the main control unit 4 issues the transfer card in a manner similar to that in the ordinary case and advances to step SA19.

SK1: The cellular phone control unit 21 which received the automatic activating instruction by the cellular phone infrared communicating unit 27 activates the transaction information processing program by the received automatic activating command, branches to the transaction information registering subprogram on the basis of the transaction information registering subprogram name, and activates the transaction information registering subprogram. A response of a message showing that the transaction information registering subprogram has been activated is directly made as an activation end notification to the infrared communicating unit 12 of the ATM 1 by the cellular phone infrared communicating unit 27.

SA18: The main control unit 4 which received the activation end notification by the infrared communicating unit 12 reads out the transfer transaction data stored in the storing unit 6, forms transfer information by adding the transaction kind (in the embodiment, the transfer transaction) to the transfer transaction data, and directly transfers the obtained transfer information to the cellular phone infrared communicating unit 27 by the infrared communicating unit 12.

SA19: The main control unit 4 which finished the transfer of the transfer information forms print data on the basis of the transfer transaction data, prints it onto a transaction itemized account by the card handling unit 8, displays a message for urging the customer to receive the transaction card and the transaction itemized account onto the display screen of the customer operating unit 7, and ejects the transaction card and the transaction itemized account by the card handling unit 8.

After that, the main control unit 4 confirms that the customer has received the transaction card and the transaction itemized account, deletes the transfer transaction data stored in the storing unit 6, finishes the transfer transaction process, returns to step SA1 through the connector (A), displays the transaction selecting display screen onto the display screen of the customer operating unit 7, and enters the standby mode.

SK2: The cellular phone control unit 21 which has activated the transaction information registering subprogram and is in the standby mode for waiting for the transfer of the transfer information displays the transfer information onto the display screen of the cellular phone display unit 25 when the transfer information is received by the cellular phone infrared communicating unit 27.

The transfer information, a guidance of an operation button which is pressed when the registration of the displayed transfer information is instructed, and a guidance of an operation button which is pressed when the registration of the transfer information is unnecessary are displayed on the display screen of the cellular phone display unit 25. The customer inputs the necessity/unnecessity of the registration by pressing the guided operation buttons of the cellular phone input unit 26.

- SK3: The cellular phone control unit 21 discriminates about the necessity of the registration of the transfer information by the pressed operation button. If the registration of the transfer information is necessary, the processing routine advances to step SK4. If the registration is unnecessary, the cellular phone control unit 21 finishes the transaction information processing program and finishes the transfer information registering process of the embodiment.
- SK4: The cellular phone control unit 21 which determines that the registration of the transfer information is necessary refers to a transaction information registering area and discriminates the presence or absence of an empty area. If there is no empty area, the cellular phone control unit 21 reads out the registered transaction information in the transaction information registering area and advances to step SK5. If the empty area exists, step SK6 follows.
- SK5: The cellular phone control unit 21 which determined that there is no empty area displays the following items on the display screen of the cellular phone display unit 25: a message for inquiring about the permission or inhibition of overwriting; the transaction kind of the read-out registered transaction information and its representative items, for example, a list table of "receiver's name" if the transaction kind is a transfer transaction or a list table of "withdrawal money amount" if the transaction kind is a withdrawal transaction; a guidance of an operation button to be depressed when the overwriting is instructed; and a guidance of an operation button to be depressed when the registration of the transfer information is stopped.

The customer inputs the permission or inhibition of the overwriting by depressing the guided operation button of the cellular phone input unit 26. In this case, if the overwriting is permitted, the transaction kind or the like for overwriting is selected by the crucial key or the like of the cellular phone input unit 26 and, thereafter, the operation button for the overwriting is pressed.

The cellular phone control unit 21 discriminates the permission or inhibition of the overwriting by the depressed operation button. If the overwriting is permitted, step SK6 follows. If the registration is stopped, the cellular phone control unit 21 finishes the transaction information processing program and finishes the transfer information registering process of the embodiment.

- SK6: The cellular phone control unit 21 which determined the presence of the empty area or that the overwriting is permitted writes the received transfer information into the empty area of the transaction information registering area of the cellular phone storing unit 24 or the registered area selected for the overwriting and registers the transaction information.

After that, the cellular phone control unit 21 finishes the transaction information processing program and finishes the transfer information registering process of the embodiment.

In the case of inputting the requester's name and the like in step SA9, it is also possible to construct in such a manner that the customer name, the telephone number, and the like are preliminarily registered into the customer information of the host computer 2, in the case of using the registered customer's name or the like, a "to next" button for stopping the input of the requester's name or the like and shifting to the next step is provided on the requester input display screen, and the input of the requester's name or the like is omitted. In this case, the host computer 2 determines that the registered customer's name or the like is used since the requester's name or the like has been omitted in the transfer transaction data, thereby attaching the registered customer's name or the like when the financial institution of the transfer destination is requested to pay the transfer money amount.

Although the case of the transfer transaction has been described above as an example, in the case where the paying transaction or the withdrawal transaction is selected as a transaction kind as well, its payment information or withdrawal information is registered into the cellular phone storing unit 24 of the cellular phone 20 as necessary.

Further, it is also possible to construct in such a manner that in the case where the transaction data is inputted by a method other than the cellular phone, that is, a method of the transfer card, registration data, or the like besides the manual input mentioned above, the transaction information is transferred and registered into the cellular phone.

Figure 8:
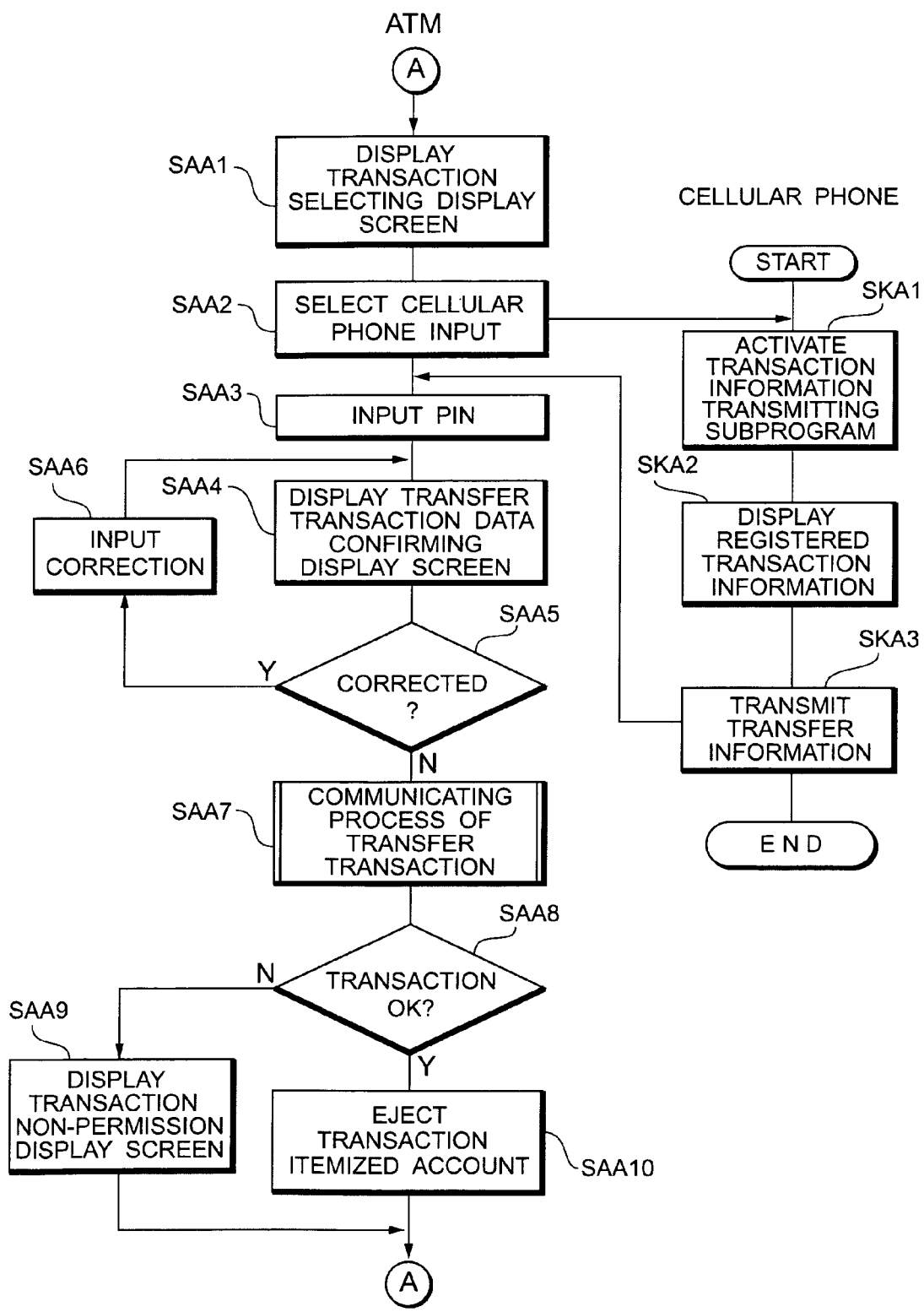
FIG. 8 is a flowchart showing a transaction information transmitting process in the transfer transaction in the embodiment 1.

The operation in the case of performing the transfer transaction by the transaction information transmitting process by using the cellular phone 20 in which the transaction information has been registered as mentioned above will now be described in accordance with processing steps with reference to a flowchart shown in FIG. 8. A step name in the case of the cellular phone 20 is shown with "SKA" and that in the case of the ATM 1 is shown with "SAA".

- SAA1: The main control unit 4 of the ATM 1 displays the transaction selecting display screen shown in FIG. 5 and enters a standby mode in a manner similar to step SA1 mentioned above.
- SAA2: The customer presses the "cellular phone input" button on the touch panel in order to input the transaction information by the cellular phone 20 from the display screen of the customer operating unit 7.

To activate a transaction information transmitting subprogram of the transaction information processing program of the cellular phone 20, the main control unit 4 which recognized the depression of the "cellular phone input" button directly transmits the automatic activating instruction in which the automatic activating command, a name of the transaction information transmitting subprogram, and the like have been written to the cellular phone 20 and enters the standby mode for waiting for the reception of the transaction information in a manner similar to step SA17 mentioned above.

- SKA1: The cellular phone control unit 21 which received the automatic activating instruction activates the transaction information processing program, branches to a transaction information transmitting subprogram, and activates it in a manner similar to step SK1 mentioned above.
- SKA2: When the transaction information transmitting subprogram is activated, the cellular phone control unit 21 reads out the transaction information registered in the transaction information registering area of the cellular phone storing unit 24 and displays the following items onto the display screen of the cellular phone display unit 25 in a manner similar to step SK5 mentioned above: the transaction kind of the transaction information; a list table of its representative items; a guidance of the operation button to be depressed when the transaction information is transmitted; and the like.

The customer selects the transaction information which is used for the transaction in the ATM 1 (transfer information in the embodiment) by the crucial key or the like of the cellular phone input unit 26 and, thereafter, presses the operation button for the transmission of it.

SKA2: The cellular phone control unit 21 which recognized the transmission of the selected transfer information attaches the personal information of the customer stored in the cellular phone storing unit 24 to the transfer information, directly transmits the obtained transfer information to the infrared communicating unit 12 of the ATM 1 by the cellular phone infrared communicating unit 27, finishes the transaction information processing program and finishes the transfer information transmitting process of the embodiment.

SAA3: The main control unit 4 in the standby mode for waiting for the reception of the transaction information stores the transfer information or the like into the storing unit 6 when the transfer information or the like is received by the infrared communicating unit 12 and recognizes the transaction as a transfer transaction by the transaction kind of the transfer information. The main control unit 4 displays the PIN input display screen onto the customer operating unit 7 in a manner similar to step SA4 mentioned above. The customer inputs the PIN by the ten-key or the like.

SAA4: The main control unit 4 which recognized the input of the PIN displays the transfer transaction data confirming display screen onto the display screen of the customer operating unit 7 in a manner similar to step SA11 mentioned above in order to decide the transfer transaction data of the received transfer information.

When the transfer transaction data is corrected, the customer selects the items to be corrected and presses the "correct" button. When the display contents are confirmed and the transfer transaction data is decided, he presses the "confirm" button.

Since the subsequent operation of steps SAA5 to SAA7 is similar to that of steps SA12 to SA14, its description is omitted here. In this case, in place of the card information of the transaction card, the personal information read out from the transfer information or the like stored in the storing unit 6 in step SAA3 mentioned above is transmitted to the host computer 2.

SAA8: The main control unit 4 which received the transfer transaction result notification telegraphic message by the communicating unit 5 advances to step SAA10 when the transfer transaction result notification telegraphic message shows that the transfer transaction is settled. If it indicates that the transfer transaction is not settled, step SAA9 follows.

SAA9: The main control unit 4 which determined that the transfer transaction is not settled displays the transaction-incomplete confirming display screen with the following contents onto the display screen of the customer operating unit 7: a message showing that the transaction is not settled; a message for urging the customer to confirm it; a "confirm" button; and the like. The customer confirms the display contents and presses the "confirm" button.

The main control unit 4 which recognized the depression of the "confirm" button deletes the transfer information and the like stored in the storing unit 6, finishes the transfer transaction process, is returned to step SA1 through the connector (A), displays the transaction selecting display screen onto the display screen of the customer operating unit 7, and enters the standby mode.

SAA10: The main control unit 4 which determined that the transfer transaction has been settled prints form data on the basis of the transaction information, prints it onto the transaction itemized account by the card handling unit 8, displays a message for urging the customer to receive the transaction itemized account onto the display screen of the customer operating unit 7, and ejects the transaction itemized account by the card handling unit 8.

After that, the main control unit 4 confirms that the customer received the transaction itemized account, deletes the transfer information and the like stored in the storing unit 6, finishes the transfer transaction process, is returned to step SA1 through the connector (A), displays the transaction selecting display screen onto the display screen of the customer operating unit 7, and enters the standby mode.

As described above, in the embodiment, as transaction information of the transaction in the ATM, the transaction information registered in the cellular phone is directly transmitted by the infrared communication and the transaction data can be inputted. Therefore, merely by inputting the PIN, the transaction in the ATM can be performed, the inputting operation can be simplified, the transaction time can be shortened, and the working efficiency of the ATM can be improved. Moreover, the transaction information which has been registered once can be read out many times and a similar transaction can be performed, and troublesomeness of the customer in association with the input of the transaction data can be eliminated. The above advantages are effective particularly in the case of the transfer transaction.

By automatically activating the transaction information processing program of the cellular phone by the automatic activating instruction from the ATM, the customer can automatically display the necessary display screen onto the cellular phone display unit merely by keeping a power source of the cellular phone in the ON state. The use efficiency of the customer can be improved, the time when the ATM is occupied by the customer can be shortened, and the working efficiency of the ATM can be further improved.

Moreover, by storing the personal information into the cellular phone and using it for the transaction in the ATM, there is no need to insert the transaction card, the transaction time can be shortened, and the use efficiency of the customer can be improved.

In addition, by inputting the PIN after the transaction information was inputted from the cellular phone, it is possible to eliminate a risk that, generally, since an account number has been recorded in a cash card or a bankbook, in the case of identifying the customer by using only the telephone number of the cellular phone as shown in JP-A-2001-175783, if both of the cellular phone and the cash card and the like are lost, a malicious third party performs a wrongdoing by using them. Even if the cellular phone in which the account number and the like have been stored is lost or stolen, the transaction cannot be performed unless the PIN is inputted. Therefore, the wrongdoing of the malicious third party can be prevented and the security of the automatic transaction system can be assured.

In addition to the above advantages, when the transaction is executed by the ATM, the transaction information is registered into the cellular phone and the transaction information which has been inputted once can be used in the subsequent transaction. Therefore, when it is necessary to perform the similar transaction a plurality of number of times, the transaction information can be used anytime. A burden of the customer on the input of the transaction data in the ATM can be lightened.

Embodiment 2

Figure 9:
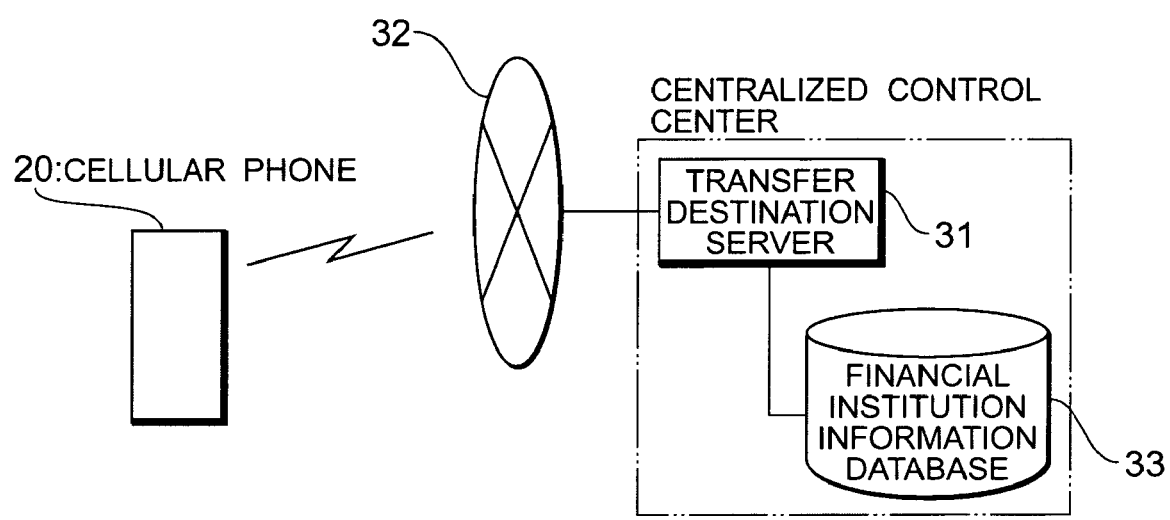
FIG. 9 is a block diagram showing a financial institution information obtaining system in the embodiment 2.

FIG. 9 is a block diagram showing a financial institution information obtaining system in the embodiment 2.

Constructions of the ATM 1 and the cellular phone 20 in the embodiment 2 are similar to those in the embodiment 1. Portions similar to those in the embodiment 1 are designated by the same reference numerals and their description is omitted here.

In FIG. 9, reference numeral 31 denotes a transfer destination server equipped in common by the financial institution or the like. The transfer destination server 31 is connected to a public network 32 such as an Internet or the like and can communicate with the cellular phone 20 of the customer. The server 31 has a financial institution information database 33 in which the following information has been stored as financial institution information: financial institution name information in which the financial institution names are arranged on the basis of a character showing the first sound (referred to as a start sound) of its name; and branch office name information in which the names of the branch offices of each financial institution or the like are arranged on the basis of the start sound every financial institution or the like.

Since the financial institution information in the financial institution information database 33 is updated periodically or as necessary by the financial institution or the like, the latest financial institution information is always stored.

As a setting place of the transfer destination server 31, all servers in the whole country can be collectively disposed in one location or the servers can be disposed every prefecture of Japan, every city, or every wide district in which a plurality of prefectures or cities are collected.

An information processing program has been stored in the transfer destination server 31 of the embodiment. The information processing program has a function for preliminarily extracting and transmitting the financial institution name information and the branch office name information from the financial institution information database 33 in response to a financial institution information transmitting request from the cellular phone 20. Various functional means are formed as hardware which is formed by each processing step of the information processing program which is executed by the transfer destination server 31.

A transaction information processing program has been stored in the cellular phone storing unit 24 of the cellular phone 20. The transaction information processing program is obtained by adding a previous input subprogram having a function for previously forming transaction information such as transfer information and the like and storing it into the cellular phone storing unit 24 to the transaction information processing program in the embodiment 1. Various functional means are formed as hardware which is formed by the cellular phone control unit 21 and each processing step of the transaction information processing program.

A password which is used when the transaction information processing program set by the customer upon making the contract or the like is activated and a URL (Uniform Resource Locator) of the transfer destination server 31 which is used when connecting to the transfer destination server 31 have previously been stored in the cellular phone storing unit 24.

The operation of the above construction will now be described.

Figure 10B:
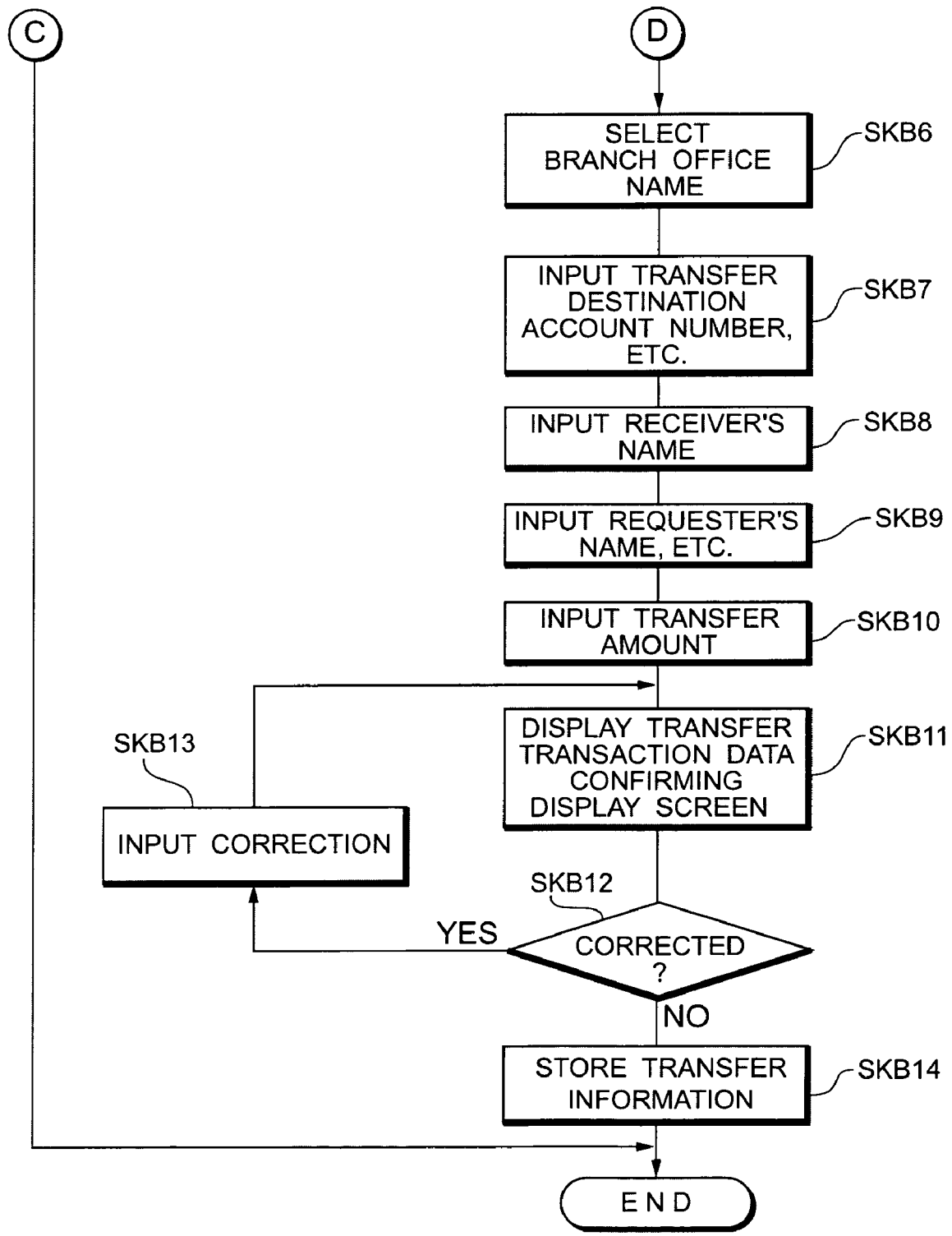
FIG. 10 is a flowchart showing a transaction information previous inputting process in the embodiment 2.

The transaction information preliminary inputting process in the embodiment will be described in accordance with processing steps with reference to a flowchart shown in FIG. 10 with respect to the case, as an example, where the customer previously inputs the transfer information as transaction information and registers it into the cellular phone storing unit 24 by using the cellular phone 20. A step name in the case of the cellular phone 20 is shown with "SKB" and that in the case of the transfer destination server 31 is shown with "SFB".

SKB1: Prior to performing the transaction by the ATM 1 in the service office of the financial institution or the like, the customer activates the transaction information processing program by the cellular phone 20 owned by himself.

SKB2: When the transaction information processing program is activated, the cellular phone control unit 21 of the cellular phone 20 displays a password input display screen onto the display screen of the cellular phone display unit 25. The following items are displayed on the password input display screen: a message for urging the customer to input his password; a password display column; a guidance of an operation button which is pressed when the end of the input is instructed; and the like. The customer inputs the preset password by using the ten-key and the like of the cellular phone input unit 26 and presses the operation button to instruct the end of the input.

SKB3: The cellular phone control unit 21 which recognized the inputted password reads out the password stored in the cellular phone storing unit 24 and collates it with the inputted password. If those passwords coincide, it is determined that the customer is the owner of the cellular phone 20 and the processing routine advances to step SKB4. If the passwords do not coincide, the cellular phone control unit 21 finishes the transaction information processing program and finishes the transaction information preliminary inputting process in the embodiment.

SKB4: The cellular phone control unit 21 which determined that the customer is the owner of the cellular phone 20 displays a process selecting display screen for selecting each process of the transaction information processing program onto the display screen of the cellular phone display unit 25.

The following items are displayed on the process selecting display screen: a selecting column of the transaction information registering process and the transaction information transmitting process in the embodiment 1 and the preliminary inputting process and the like of the transfer transaction data and the withdrawal transaction data in the embodiment 2; a guidance of the operation button which is pressed when the end of the selection is instructed; and the like.

The customer selects the selecting column of the preliminary inputting process of the transfer transaction data by using the crucial key and the like of the cellular phone input unit 26 and presses the operation button to instruct the end of the selection.

The cellular phone control unit 21 which recognized the selection of the preliminary inputting process of the transfer transaction data branches to the preliminary inputting subprogram, reads out the URL of the transfer destination server 31 stored in the cellular phone storing unit 24, and transmits the financial institution information transmitting request in which the URL has been written to the transfer destination server 31 through the public network 32 by the wireless communicating unit 22.

SFB1: The transfer destination server 31 which is in the standby mode for waiting for the reception of the financial institution information transmitting request accepts the financial institution information transmitting request when it is received. Since the financial institution name is not attached to the transmitting request, the server 31 determines that such a request is a new financial institution information transmitting request, extracts the financial institution name information arranged on the basis of the start sound from the financial institution information database 33, and transmits it to the cellular phone 20 of a transmitting source side through the public network 32 in a wireless manner.

SKB5: The cellular phone control unit 21 which received the financial institution name information from the transfer destination server 31 by the wireless communicating unit 22 stores the financial institution name information into the cellular phone storing unit 24 and displays a transfer destination financial institution name input display screen onto the display screen of the cellular phone display unit 25.

The following items are displayed on the transfer destination financial institution name input display screen: a guidance of a method of inputting the start sound of the financial institution name; a guidance of the operation button which is pressed when the end of the selection is instructed; and the like. The customer inputs the start sound of the financial institution name of the transfer destination by the ten-key and the like and presses the operation button for instructing the end of the input.

The cellular phone control unit 21 which recognized the inputted start sound displays, as a next display screen, a selecting column constructed by a list of the financial institution names of the corresponding start sound of the received financial institution name information, a guidance of the operation button which is pressed when the end of the selection is instructed, and the like onto the display screen of the cellular phone display unit 25. The customer selects the selecting column of the financial institution name of the transfer destination by using the crucial key and the like of the cellular phone input unit 26 and presses the operation button for instructing the end of the selection.

The cellular phone control unit 21 which recognized the selection of the financial institution name of the transfer destination writes the URL of the transfer destination server 31 to a financial institution name selection end notification to which the financial institution name has been attached and transmits the obtained financial institution name selection end notification to of the transfer destination server 31 through the public network 32 by the wireless communicating unit 22.

SFB2: The transfer destination server 31 which received the financial institution name selection end notification determines the corresponding financial institution or the like on the basis of the attached financial institution name, extracts the branch office name information of the branch office names arranged on the basis of the start sound of the corresponding financial institution or the like from the financial institution information database 33, transmits it to the cellular phone 20 of the transmitting source side through the public network 32, is returned to step SFB1 through a connector (B), and enters the standby mode for waiting for the reception of the financial institution information transmitting request.

SKB6: The cellular phone control unit 21 which received the branch office name information from the transfer destination server 31 stores the branch office name information into the cellular phone storing unit 24 and displays a transfer destination branch office name input display screen onto the display screen of the cellular phone display unit 25.

A guidance of an inputting method of the start sound of the branch office name, a guidance of the operation button which is pressed when the end of the selection is instructed, and the like are displayed on the transfer destination branch office name input display screen. The customer inputs the start sound of the branch office name of the transfer destination by the ten-key and the like and presses the operation button for instructing the end of the selection.

The cellular phone control unit 21 which recognized the inputted start sound displays, as a next display screen, a selecting column constructed by a list of the branch office names of the corresponding start sound of the received branch office name information, a guidance of the operation button which is pressed when the end of the selection is instructed, and the like onto the display screen of the cellular phone display unit 25. The customer selects the selecting column of the branch office name of the transfer destination by using the crucial key and the like of the cellular phone input unit 26 and presses the operation button for instructing the end of the selection.

SKB7: The cellular phone control unit 21 which recognized the selection of the branch office name of the transfer destination displays a transfer destination account input display screen for inputting a transfer destination account and the like onto the display screen of the cellular phone display unit 25.

A display column of the account number of the transfer destination and its subject, a guidance of the operation button which is pressed when the end of the input is instructed, and the like are displayed on the transfer destination account input display screen. The customer inputs the account number and the like of the transfer destination by the ten-key and the like of the cellular phone input unit 26 and presses the operation button for instructing the end of the input.

SKB8: The cellular phone control unit 21 which recognized the input of the transfer destination account number and the like displays a receiver input display screen for inputting a receiver's name onto the display screen of the cellular phone display unit 25.

A display column of the receiver's name, a guidance of the operation button which is pressed when the end of the input is instructed, and the like are displayed on the receiver input display screen. The customer inputs the receiver's name by the ten-key and the like of the cellular phone input unit 26 and presses the operation button for instructing the end of the input.

SKB9: The cellular phone control unit 21 which recognized the input of the receiver's name displays a requester input display screen for inputting a requester's name and the like onto the display screen of the cellular phone display unit 25.

A display column of the requester's name, his contact address, and the like, a guidance of the operation button which is pressed when the end of the input is instructed, and the like are displayed on the requester input display screen. The customer inputs the requester's name and the like by the ten-key and the like of the cellular phone input unit 26 and presses the operation button for instructing the end of the input.

In this case, it is also possible to construct the system in such a manner that the customer's name, the telephone number, and the like are previously stored in the cellular phone storing unit 24, when the stored requester's name and the like are used, the input of the requester's name and the like onto the requester input display screen is stopped, the operation button which is pressed when shifting the processing routine to the next step is guided, and the input of the requester's name and the like are also omitted. At this time, the cellular phone control unit 21 recognizes the customer's name and the like read out from the cellular phone storing unit 24 as inputted requester's name and the like of the transfer transaction data and advances to step SKB10.

SKB10: The cellular phone control unit 21 which recognized the input of the requester's name and the like displays a transfer money amount input display screen onto the display screen of the cellular phone display unit 25.

A transfer money amount display column, a guidance of the operation button which is pressed when the end of the input is instructed, and the like are displayed on the transfer money amount input display screen. The customer inputs the transfer money amount by the ten-key and the like of the cellular phone input unit 26 and presses the operation button for instructing the end of the input.

SA11: The cellular phone control unit 21 which recognized the input of the transfer money amount displays a transfer transaction data confirming display screen onto the display screen of the cellular phone display unit 25 in order to determine the inputted transfer transaction data.

The following items are displayed on the transfer transaction data confirming display screen: a message for urging the customer to confirm the transfer transaction data; an operating method in the case of correcting such a message; a transfer destination financial institution name as inputted transfer transaction data; its branch office name; an account number of the transfer destination; and its subject; a receiver's name; a requester's name; his contact address; a transfer money amount; an operation button which is pressed when instructing to correct the transfer information; a guidance of the operation button which is pressed when instructing the confirmation of the display contents; and the like.

To correct the transfer transaction data, the customer selects the display column of the item to be corrected by the ten-key and the like of the cellular phone input unit 26 and presses the operation button for instructing the correction. To confirm the display contents and determine the transfer transaction data, the customer presses the operation button to instruct the confirmation.

SA12: When the cellular phone control unit 21 recognizes the depression of the operation button to instruct the confirmation, it is determined that the transfer transaction data has been confirmed, and the processing routine advances to step SKB14. When it is recognized that the operation button to instruct the correction has been pressed, the processing routine advances to step SKB13.

SKB13: The cellular phone control unit 21 which recognized the depression of the operation button to instruct the correction displays a transfer transaction data correcting display screen according to the selected item onto the display screen of the cellular phone display unit 25.

For example, when the transfer destination financial institution name is selected as an item to be corrected, the cellular phone control unit 21 displays a transfer transaction data correcting display screen in which the financial institution name inputted in step SKB5 is shown on the transfer destination financial institution name input display screen described in step SKB5 onto the display screen of the cellular phone display unit 25. The customer inputs the start sound of the transfer destination financial institution name which is inputted again by the ten-key and the like and presses the operation button for instructing the end of the input.

The cellular phone control unit 21 which recognized the inputted start sound displays, as a next display screen, a list and the like of the financial institution name of the corresponding start sound of the financial institution name information stored in the cellular phone storing unit 24 in a manner similar to step SKB5 mentioned above. The customer selects the selecting column of the transfer destination financial institution name to be inputted again and presses the operation button for instructing the end of the input.

The cellular phone control unit 21 which recognized the depression of the operation button for instructing the end of the input transmits the financial institution information transmitting request to which the re-inputted transfer destination financial institution name has been attached to the transfer destination server 31 through the public network 32 by the wireless communicating unit 22.

The transfer destination server 31 which is in the standby mode for waiting for the reception of the financial institution information transmitting request accepts the financial institution information transmitting request when it is received. Since the financial institution name has been attached to the transmitting request, the transfer destination server 31 determines that such a request is a financial institution information transmitting request for correcting the branch office name and advances to step SFB2. In a manner similar to the above, the server 31 transmits the extracted branch office name information to the cellular phone 20, is returned to step SFB1 through the connector (B), and enters the standby mode for waiting for the reception of the financial institution information transmitting request.

The cellular phone control unit 21 which received the branch office name information from the transfer destination server 31 accepts the selection of the branch office name of the transfer destination in a manner similar to step SKB6 mentioned above, recognizes the selected branch office name, is returned to step SKB11, displays the transfer transaction data confirming input display screen on which the re-inputted financial institution name, branch office name, and the like have been displayed onto the display screen of the cellular phone display unit 25. When the operation button to instruct the confirmation is pressed, the processing routine advances to step SKB14 from step SKB12.

When the correction of the branch office name is selected, the cellular phone control unit 21 displays the transfer transaction data correcting display screen in which the financial institution name and the like inputted in step SKB6 is shown on the transfer destination branch office name input display screen described in step SKB6 onto the display screen of the cellular phone display unit 25. The cellular phone control unit 21 accepts the selection of the branch office name of the transfer destination in a manner similar to step SKB6, recognizes the selected branch office name, is returned to step SKB11, and displays again the transfer transaction data confirming display screen on which the re-inputted branch office name and the like have been displayed onto the display screen of the cellular phone display unit 25. When the operation button to instruct the confirmation is pressed, the processing routine advances to step SKB14 from step SKB12. This is true of the case where another item is selected.

SKB14: The cellular phone control unit 21 which recognized the determination of the transfer transaction data registers the transfer information in which the transfer transaction has been written in the decided transfer transaction data every transaction kind into the transaction information storing area of the cellular phone storing unit 24. In this case, if the transaction information is registered after completion of the processes of steps SK3 to SK5 in the embodiment 1 mentioned above, the use convenience of the customer can be further improved.

After that, the cellular phone control unit 21 deletes the financial institution information in the cellular phone storing unit 24, finishes the transaction information processing program, and finishes the transaction information preliminary inputting process of the embodiment.

As mentioned above, even if the cellular phone 20 in which the transaction information which had previously been inputted has been registered is used, the transfer transaction by the ATM 1 can be executed by the transaction information transmitting process in the embodiment 1.

As described above, according to the embodiment 1, in addition to the effect similar to that in the embodiment 1, since the latest financial institution information is obtained from the transfer destination server by the cellular phone and the transaction information is previously inputted and registered, the customer can always register the transfer information by the latest financial institution information even if the financial institution name or the like of the past transfer information is changed. There is no need to make correction or the like to the error of the financial institution name or the like in the ATM. Wasteful confusion at the time of the transfer transaction due to the registered transfer information can be prevented. The transaction time of the transfer transaction in the ATM can be shortened by the smooth inputting operation of the transfer transaction.

By inputting the password upon activation of the transaction information processing program of the cellular phone, even if the cellular phone is lost or stolen, the transaction information cannot be registered unless the PIN is inputted. The wrongdoing of the malicious third party can be prevented.

Although each of the foregoing embodiments has been described on the assumption that the personal digital assistant (PDA) is the cellular phone, the PDA is not limited to the cellular phone but can be a portable information apparatus such as electronic system notebook, personal communicating apparatus, or the like having an infrared communicating function. In this case, in the case of the apparatus which does not have the connecting function to the public network by the wireless communication, the PDA can be also connected to the public network through the telephone line or the like.

Although each of the foregoing embodiments has been described on the assumption that the direct communication between the ATM and the cellular phone as a PDA of the customer is made by the infrared communication, such direct communication can be a short range wireless communication using the wireless manner.

Further, although the embodiments have been described on the assumption that the transaction information registration subprogram, the transaction information transmission subprogram, and the preliminary input subprogram are included in the transaction information processing program, those subprograms can be stored and supplied as independent programs from the financial institution or the like into the portable storing unit at the time of making the contract or the like.

Further, although the embodiments have been described on the assumption that the transaction information registration subprogram and the transaction information transmission subprogram are automatically activated by the command from the ATM, after the customer activated each subprogram by the cellular phone in a manner similar to steps SKB2 to SKB4 of the embodiment 2, he can make the transaction with the ATM. Thus, the transaction cannot be made if the third party does not know the password. The safety of the automatic transaction system can be further improved.

Moreover, although the embodiments have been described on the assumption that the automatic transaction apparatus is the ATM, a similar effect can be obtained if the invention is applied to the automatic transaction apparatus such as multimedia terminal, automatic loan-application machine, or the like in which the transaction time can be shortened if transaction information or the like is preliminarily formed.

What is claimed is:

1. An automatic transaction system comprising:
   a personal digital assistant (PDA) of a customer; and
   an automatic transaction apparatus constructed so that said automatic transaction apparatus directly communicates; with said personal digital assistant, said automatic transaction apparatus including a main control unit that executes a transaction process and controls each unit of the automatic transaction apparatus, and a customer operating unit that displays various screens to promote a procedure of the customer based on customer selection, after the customer selection of data during the transaction process, the main control unit controls a communicating unit of the automatic transaction apparatus that sends the transaction data to the personal digital assistant,
   wherein the communicating unit of said automatic transaction apparatus has transaction information direct receiving means which directly receives transaction information input from said personal digital assistant, and
   said personal digital assistant has a PDA control unit, transaction information storing means which stores the transaction information and is controlled by the PDA control unit to register the inputted transaction information, transaction information display means which reads out the transaction information from said transaction information storing means and displays said transaction information and transaction information direct transmitting means which directly transmits the corresponding transaction information to said automatic transaction apparatus when said displayed transaction information is selected where the PDA control unit controls each means in the personal digital assistant, and
   wherein if a transaction process needs to be executed where the transaction information was already registered by the transaction information storing means, the main control unit controls the communicating unit of the automatic transaction apparatus to send a data sending request, the PDA control unit reads out the transaction data from the transaction information storing means and controls a communicating unit of the personal digital assistant to send the transaction data to the automatic transaction apparatus, and
   after the registered transaction data is received in the automatic transaction apparatus, the main control unit executes the transaction process on the basis of the received transaction data without the customer re-inputting the same transaction data.

2. The automatic transaction system according to claim 1, wherein said automatic transaction apparatus has automatic activating command transmitting means which transmits a command for automatically activating a program stored in said personal digital assistant, and
   said personal digital assistant has program activating means which directly receives said automatic activating command and activates the corresponding program.

3. The automatic transaction system according to claim 2, wherein said automatic transaction apparatus has automatic activating command transmitting means which transmits a command for automatically activating a program stored in said personal digital assistant, and said personal digital assistant has program activating means which directly receives said automatic activating command and activates the corresponding program.

4. The automatic transaction system according to claim 1, wherein said automatic transaction apparatus has transaction information direct transferring means which, when the transaction information is inputted by a method other than said personal digital assistant, directly transfers said inputted transaction information to said personal digital assistant, and said personal digital assistant has transaction information writing means which, when said transferred transaction information is received, writes said transaction information into said transaction information storing means.

5. The automatic transaction system according to claim 1, wherein said transaction information is transfer information.

6. The automatic transaction system according to claim 1, further comprising a transfer destination server, and wherein said transaction information is transfer information; said personal digital assistant comprises transfer information preliminary inputting means which preliminarily inputs said transfer information and financial institution information transmitting request transmitting means which transmits a transmitting request of the financial institution information to said transfer destination server; and said transfer destination server comprises financial institution information storing means which stores the financial institution information and financial institution information transmitting means which, when said financial institution information transmitting request is received, reads out the financial institution information from said financial institution information storing means and transmits said financial institution information to said personal digital assistant.

7. The automatic transaction system according to claim 1, wherein the personal digital assistant is a cellular phone.

* * * * *